United States Patent
Uematsu

(10) Patent No.: US 8,014,927 B2
(45) Date of Patent: Sep. 6, 2011

(54) ANTILOCK BRAKE SYSTEM CONTROL DEVICE AND METHOD

(75) Inventor: Koji Uematsu, Mooka (JP)

(73) Assignee: Komatsu Ltd., Tokyo (JP)

( * ) Notice: Subject to any disclaimer, the term of this patent is extended or adjusted under 35 U.S.C. 154(b) by 851 days.

(21) Appl. No.: 11/991,241

(22) PCT Filed: Jul. 31, 2006

(86) PCT No.: PCT/JP2006/315128
§ 371 (c)(1),
(2), (4) Date: Feb. 29, 2008

(87) PCT Pub. No.: WO2007/026496
PCT Pub. Date: Mar. 8, 2007

(65) Prior Publication Data
US 2009/0138169 A1 May 28, 2009

(30) Foreign Application Priority Data
Aug. 29, 2005 (JP) .................................. 2005-247918

(51) Int. Cl.
*B60T 7/12* (2006.01)
*B60T 8/32* (2006.01)
*B60T 8/86* (2006.01)

(52) U.S. Cl. ............. 701/71; 701/93; 303/121; 303/125

(58) Field of Classification Search .............. 701/70–71, 701/78–79; 303/121, 122.02, 125
See application file for complete search history.

(56) References Cited

U.S. PATENT DOCUMENTS
| 4,477,124 A | * | 10/1984 | Watanabe ..................... 303/191 |
| 5,484,044 A | * | 1/1996 | Bursteinas et al. ........... 188/353 |
| 5,941,614 A | | 8/1999 | Gallery et al. |

(Continued)

FOREIGN PATENT DOCUMENTS
JP    3-34959 U    4/1991

(Continued)

OTHER PUBLICATIONS
International Preliminary Report on Patentability and Written Opinion dated Mar. 4, 2008, issued in counterpart International Application.

*Primary Examiner* — Yonel Beaulieu
(74) *Attorney, Agent, or Firm* — Holtz, Holtz, Goodman & Chick, PC

(57) ABSTRACT

An object of the present invention is to provide an antilock brake system control device that can realize an accurate constant speed running control by cooperating an ABS control and a constant speed running. The control device includes: an ABS control hydraulic circuit that controls an ABS of each wheel; constant speed running controllers 213, 271 that supply hydraulic pressure to a rear brake 12 when a vehicle runs down a slope; wheel rotation speed detectors 13FL, 13FR, 13RL, 13RR; a monitor 67 that monitors a set speed under constant speed running control; a monitor 61 that monitors actual speed of the vehicle; a judging unit 68 that judges whether running speed is being kept constant or not based on the set speed and the actual speed; and a regulator 69 that regulates decompression by the ABS control when it is judged that the running speed is not being kept constant.

2 Claims, 3 Drawing Sheets

U.S. PATENT DOCUMENTS

| | | | |
|---|---|---|---|
| 6,299,263 B1 * | 10/2001 | Uematsu et al. | 303/192 |
| 6,356,832 B1 * | 3/2002 | Gamberg | 701/71 |
| 6,456,922 B1 * | 9/2002 | Gamberg | 701/71 |
| 6,692,090 B1 | 2/2004 | Heyn et al. | |

FOREIGN PATENT DOCUMENTS

| | | |
|---|---|---|
| JP | 03-34959 U | 4/1991 |
| JP | 5-319233 A | 12/1993 |
| JP | 7-14180 10 U | 3/1995 |
| JP | 8-175221 A | 7/1996 |
| JP | 9-221019 A | 8/1997 |
| JP | 10-198417 A | 7/1998 |
| JP | 10-507145 A | 7/1998 |
| JP | 2001-73841 A | 3/2001 |
| JP | 2003-525156 A | 8/2003 |

* cited by examiner

ANTILOCK BRAKE SYSTEM CONTROL DEVICE AND METHOD

This application is a U.S. National Phase Application under 35 USC 371 of International Application PCT/JP2006/315128 filed Jul. 31, 2006.

TECHNICAL FIELD

The present invention relates to an antilock brake system control device and method. The control device and method regulate an antilock brake system of a vehicle that has a retarder to control constant speed running while avoiding wheels of the vehicle to be locked upon braking of the vehicle.

BACKGROUND ART

Conventionally, an antilock brake system (ABS) of a vehicle is controlled by an ABS control system to avoid wheels of the vehicle to be locked upon sudden braking and assure proper running stability.

Specifically, it is well known as a technique that a wheel speed sensor is provided on each wheel of a vehicle and outputs from the wheel speed sensor are processed by an electronic control system to control the ABS. The minimum, maximum or average output value of the wheel speed sensor is selected as a vehicle speed to calculate slipping rate based on the vehicle speed and a wheel speed of each wheel to judge whether any wheel skids or not to start ABS control (for example, see Patent Document 1).

Traditionally, a retarder is provided on vehicles such as a dump truck to avoid overrun of an engine when the vehicles run down a long slope carrying a heavy load. The retarder is controlled by a retarder controller. The retarder controller detects rotation frequency of an output shaft of an engine and an input shaft of a transmission by a sensor and the like. When the detected rotation frequency of the shaft exceeds a certain threshold, the retarder is started to be operated to avoid overrun of the engine (for example, see Patent Document 2).

Cooperation between an ABS and a retarder simultaneously realizes constant speed running of a vehicle and proper braking force for the vehicle which avoids wheels to be locked.

[Patent Document 1] JP-UM-A-7-14180 ([0019]-[0020])
[Patent Document 2] JP-A-10-198417 (FIG. 2, page 2)

DISCLOSURE OF THE INVENTION

Problems to be Solved by the Invention

However, upon such a cooperation of an ABS and a retarder, if the ABS is functioned while constant speed running control is conducted by the retarder, braking force decreases by brake release and a vehicle is accelerated by a downward slope. Consequently, constant speed running at a speed determined by the retarder cannot be achieved.

An object of the present invention is to provide an antilock brake system control device and method of which an ABS and a retarder cooperate properly to be able to realize constant speed running at a certain speed set by a retarder.

Means for Solving the Problems

According to an aspect of the present invention, an antilock brake system control device regulates an antilock brake system of a vehicle that has a retarder to control constant speed running while avoiding wheels of the vehicle to be locked upon braking of the vehicle. The control device includes: a rotation speed detector that detects a rotation speed of each of the wheels; a brake controller that controls the braking of each of the wheels based on the rotation speed of each of the wheels which is detected by the rotation speed detector; a retarder control judging unit that judges whether constant speed running control is conducted by the retarder or not; a set speed monitor that monitors a set speed determined by the retarder when the retarder control judging unit judges that the constant speed running control is conducted by the retarder; an actual speed monitor that monitors an actual speed of the vehicle which is calculated based on the rotation speed of each of the wheels detected by the rotation speed detector; a constant speed keeping judging unit that judges whether a running speed is being kept constant at the set speed determined by the retarder or not using the set speed monitor and the actual speed monitor, and an ABS control regulator that regulates brake control by the brake controller when it is judged that the running speed is not being kept constant at the set speed.

According to the aspect of the present invention, the set speed monitor judges whether constant speed running control is conducted by the retarder. When constant speed running control is conducted, whether the running speed is kept constant or not is judged based on the set speed and the actual speed. When the running speed is not kept constant, the ABS control regulator regulates the ABS control. As a consequence, running speed can be surely kept constant by the retarder.

According to another aspect of the present invention, there is provided an antilock brake system control method that regulates an antilock brake system of a vehicle that has a retarder to control constant speed running while avoiding wheels of the vehicle to be locked upon braking of the vehicle. The control method includes steps of: detecting a rotation speed of each of the wheels; controlling the braking of each of the wheels based on the detected rotation speed of each of the wheels; judging whether constant speed running control is conducted by the retarder or not; judging whether a running speed is being kept constant at a set speed determined by the retarder based on an actual speed of the vehicle which is calculated from the set speed determined by the retarder and the rotation speed of each of the wheels when it is judged that the constant speed running control is conducted by the retarder, and regulating the brake control when it is judged that the running speed is not being kept constant at the set speed.

According to the control method of this another aspect of the present invention, the same advantages as the above-mentioned control device of the present invention can be enjoyed.

EXPLANATION OF CODES

10 . . . wheel, 13FL, 13FR, 13RL, 13RR . . . rotation speed detector, 61 . . . actual speed monitor, 67 . . . set speed monitor (retarder control judging unit), 68 . . . constant speed keeping judging unit, 69 . . . ABS control regulator, 70~73 . . . brake controller

BEST MODE FOR CARRYING OUT THE INVENTION

An embodiment of the present invention will be described below with reference to the accompanying drawings.

1. Overall Arrangement of Brake 1

Figure 1:
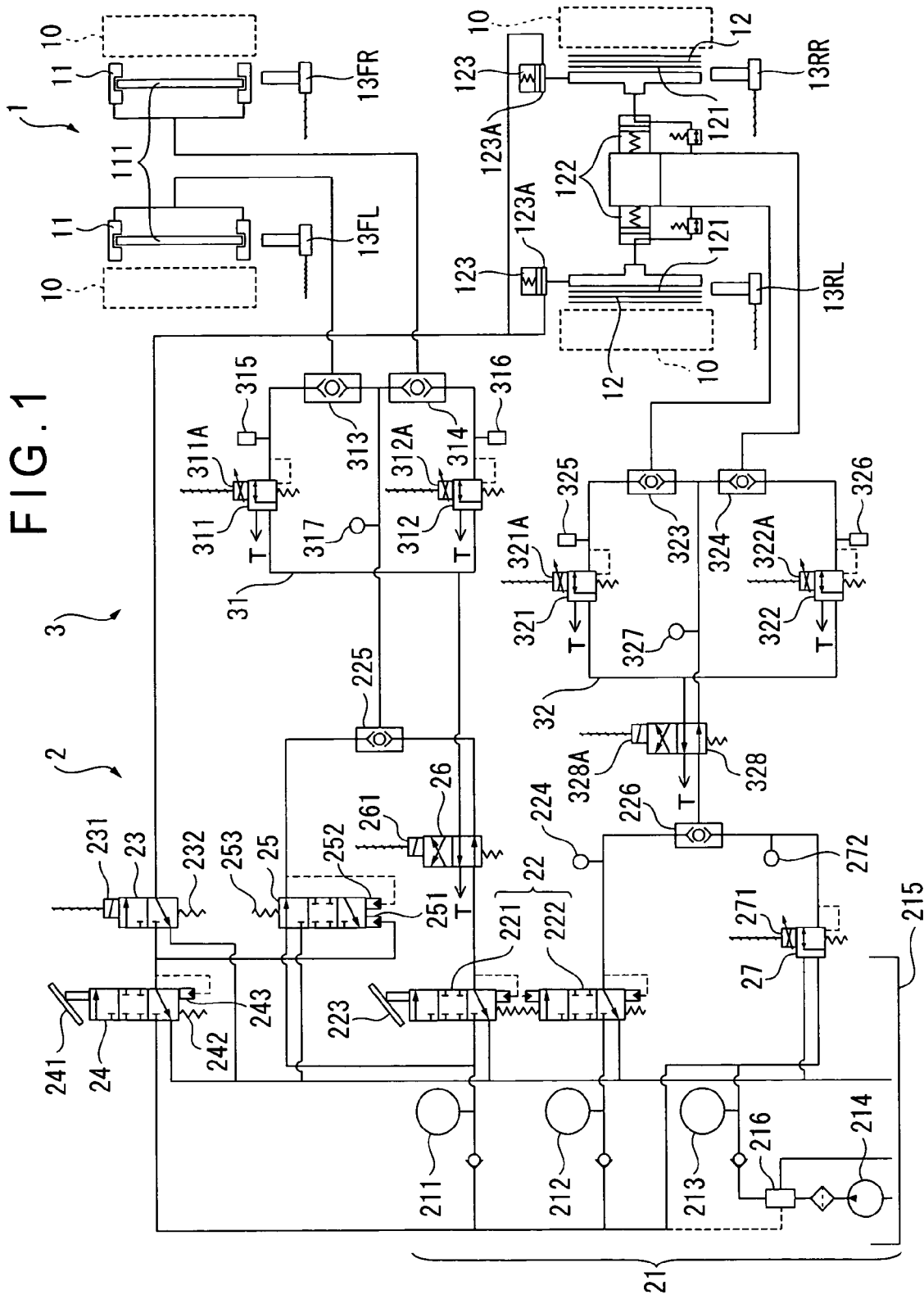
FIG. 1 is a diagram showing an arrangement of a brake of a service vehicle according to an embodiment of the present invention.

FIG. 1 shows a brake 1 according to the embodiment of the present invention. The brake 1 is to be provided on a dump truck (a service vehicle). Although not shown, a vehicle body that constitutes the dump truck includes an engine, a transmission, a drive shaft and a differential. Output rotation of the engine is shifted by the transmission to rotate the drive shaft and further a wheel 10 via the differential finally to be transmitted to a road surface. A front brake 11 and a rear brake 12 are provided on the wheel 10 of such a vehicle body.

The front brake 11 is arranged to be provided with a front wheel single plate brake 111. The rear brake 12 is arranged as an oil-cooled multiplate disc brake to be provided with a rear wheel multiplate brake 121, a slack adjuster 122 and a parking brake 123.

In addition, as it will be detailed below, each of the wheels 10 is provided with a rotation speed sensor 13FL, 13FR, 13RL, 13RR to detect a rotation speed of each of the wheels 10. Rotation speed signal detected by each of the rotation speed sensors 13FL, 13FR, 13RL, 13RR is output as electronic signal to a controller that controls the brake 1.

2. Arrangement of Brake Hydraulic Circuit 2

The front brake 11 and the rear brake 12 are all controlled by hydraulic pressure. When pressure oil is output from a brake hydraulic circuit 2 that controls hydraulic pressure, the pressure oil is provided to each portion of the front brake 11 and the rear brake 12 via an ABS control hydraulic circuit 3 to function each portion by the hydraulic pressure. The brake hydraulic circuit 2 is provided with a hydraulic pressure supply system 21, a foot brake valve 22, a parking brake valve 23, an emergency brake valve 24, a relay valve 25, a front brake cut valve 26 and an electromagnetic proportional pressure reducing valve 27.

In addition, as will be detailed below, the ABS control hydraulic circuit 3 is provided with a front wheel hydraulic circuit 31 and a rear wheel hydraulic circuit 32.

The hydraulic pressure supply system 21 is provided with a plurality of hydraulic accumulators 211, 212, 213, a hydraulic pump 214 and a reservoir 215 as hydraulic pressure source. Pressure oil of the hydraulic accumulators 211, 212, 213 is sent to the front brake 11 and the rear brake 12 via the foot brake valve 22 so that the front brake 11 and the rear brake 12 brake the wheels 10 respectively.

The hydraulic accumulators 211, 212, 213 raise pressure of hydraulic oil in the reservoir 215 using the hydraulic pump 214 driven by the engine (a driving source). The hydraulic accumulators 211, 212, 213 receive pressure oil of the hydraulic pump 214 and accumulate the pressure oil by a predetermined pressure. When the predetermined pressure is achieved, the hydraulic accumulators 211, 212, 213 unload the pressure oil of the hydraulic pump 214 using an unloading system 216 provided between the hydraulic pump 214 and the hydraulic accumulator 213.

A front wheel brake valve 221 and a rear wheel brake valve 222 constitute the foot brake valve 22. When a pedal 223 is operated, the front wheel brake valve 221 sends pressure oil of the hydraulic accumulator 211 to the front brake 11 and the rear wheel brake valve 222 sends pressure oil of the hydraulic accumulator 212 to the rear brake 12 for braking.

Specifically, when the pedal 223 is operated to change the position of a spool of the front wheel brake valve 221 so that the pressure oil of the hydraulic accumulator 211 is output from the front wheel brake valve 221, the pressure oil is provided to the front brake 11 via the front brake cut valve 26, a shuttle valve 225 and the front wheel hydraulic circuit 31 of the ABS control hydraulic circuit 3 to realize braking by the front brake 11.

In this case, the position of the spool of the rear wheel brake valve 222 is simultaneously changed and pressure oil of the hydraulic accumulator 212 is output from the rear wheel brake valve 222. The pressure oil is provided to the slack adjuster 122 of the rear brake 12 via a shuttle valve 226 and the rear wheel hydraulic circuit 32 to realize braking by the rear brake 12.

Parking brake valve 23 is provided with a solenoid 231 and a spring portion 232 to operate the parking brake 123 of the rear brake 12 mentioned above. When a parking switch inside a driver's cabin (not shown) is switched to a parking position, the parking brake valve 23 moves to a position where pressure oil from the hydraulic accumulator 213 is blocked and sends pressure oil of a rear wheel cylinder chamber 123A inside the parking brake 123 back to the reservoir 215 of the hydraulic pressure supply system 21 so that parking brake pressure becomes 0.

Accordingly, the rear wheel multiple brake 121 of the rear brake 12 is pressed by a rear wheel spring of the parking brake 123 to be attached to keep the braking status upon parking.

Upon driving, the parking switch (not shown) is switched to a driving position so that the position of the parking brake valve 23 is switched by the solenoid 231 to provide pressure oil of the hydraulic accumulator 213 to the rear wheel cylinder chamber 123A to raise parking brake pressure.

Accordingly, the rear wheel spring of the parking brake 123 is pushed back by parking brake pressure inside the rear wheel cylinder chamber 123A to space and release the rear wheel multiplate brake 121 so that the vehicle becomes ready for drive.

The emergency brake valve 24 is provided with a foot pedal 241, a spring portion 242 and a pilot pressure chamber 243 to control emergency brake pressure of the rear wheel cylinder chamber 123A to urgently brake a vehicle.

The emergency brake valve 24 is placed to a position where pressure oil from the hydraulic accumulator 213 is supplied to the rear wheel cylinder chamber 123A of the parking brake 123 upon driving to supply pressure oil to the rear wheel cylinder chamber 123A so as to space and release the rear wheel multiplate brake 121.

When an operator operates the foot pedal 241, the emergency brake valve 24 is positioned to communicate with the reservoir 215 to decompress the pressure oil of the hydraulic accumulator 213, which is supplied to the rear wheel cylinder chamber 123A of the parking brake 123 as emergency brake pressure.

Accordingly, braking by the rear brake 12 is started by being pressed with the spring of the parking brake 123.

The relay valve 25 is provided to give braking force to the front brake 11 to improve braking force at an emergency brake. The relay valve 25 is arranged to have a first pilot pressure chamber 251, a second pilot pressure chamber 252 and a spring portion 253.

While output pressure of the emergency brake valve 24 upon driving is input to the first pilot pressure chamber 251, the relay valve 25 is positioned to communicate with reservoir 215 to keep a supply line to the front brake 11 decompressed to disengage braking by the front brake 11.

When the foot pedal 241 of the emergency brake valve 24 is operated, output pressure of the emergency brake valve 24 is decreased. Accordingly, pressure given to the first pilot pressure chamber 251 is decreased and the position of the relay valve 25 is changed by biasing force of the spring portion 253. Then, pressure oil from the hydraulic accumulator 211 becomes to be supplied so that the front brake 11 is supplied with pressure oil and braking by the front brake 11 is started. According to the above, when the emergency brake valve 24 is operated, in addition to braking by the rear brake 12, braking by the front brake 11 is started.

The electromagnetic proportional pressure reducing valve 27 is a control valve that allows the brake 1 to function as a retarder to prevent the engine from overrun when the service vehicle runs down a long slope carrying a heavy load, which is provided on the way of piping from the hydraulic accumulator 213 to the shuttle valve 226.

The electromagnetic proportional pressure reducing valve 27 is controlled by the above-mentioned controller (not shown in FIG. 1). Information such as inclination of a slope where the service vehicle drives, loaded weight and vehicle speed set by a driver is input to the controller. The controller outputs electronic signal to a solenoid 271 of the electromagnetic proportional pressure reducing valve 27 based on these conditions of the information to adjust an opening degree of the electromagnetic proportional pressure reducing valve 27 so as to output pressure oil from the hydraulic accumulator 213 to the shuttle valve 226.

In the shuttle valve 226, one of the pressure oil output from the rear wheel brake valve 222 and the pressure oil output from the electromagnetic proportional pressure reducing valve 27 which is higher in pressure is supplied to the slack adjuster 122 of the rear brake 12 so that brake by the rear brake 12 is executed.

This kind of retarder adjusts the opening degree of the electromagnetic proportional pressure reducing valve 27 calculating various loads imposed on the service vehicle to control the service vehicle to be driven by a constant speed without the driver operating the pedal 223 of the foot brake valve 22.

Further, a pressure switch 224 is provided on the way of piping from the rear wheel brake valve 222 to the shuttle valve 226 to detect ON/OFF of the foot brake valve 22. In addition, a pressure switch 272 is provided on the way of piping from the electromagnetic proportional pressure reducing valve 27 to the shuttle valve 226 to detect ON/OFF of the electromagnetic proportional pressure reducing valve 27.

3. Arrangement of ABS Control Hydraulic Circuit 3

As shown in FIG. 1, the ABS control hydraulic circuit 3 is provided on the way of piping from the brake hydraulic circuit 2 to the front brake 11 and the rear brake 12. The ABS control hydraulic circuit 3 is provided with the front wheel hydraulic circuit 31 and the rear wheel hydraulic circuit 32 as mentioned above.

The front wheel hydraulic circuit 31 is arranged as a hydraulic circuit that controls ABS of the front brake 11 and is provided with two electromagnetic proportional pressure reducing valves 311 and 312, two shuttle valves 313 and 314, two pressure sensors 315 and 316 and a pressure switch 317.

The electromagnetic proportional pressure reducing valves 311, 312 are control valves respectively provided on piping lines branched from the middle of a piping line whose base end is connected to an output side of the front brake cut valve 26 to control the ABS. The electromagnetic proportional pressure reducing valves 311 is a valve that controls supply of pressure oil to the left side of the front brake 11. The electromagnetic proportional pressure reducing valves 312 is a valve that controls supply of pressure oil to the right side of the front brake 11.

Solenoids 311A, 312A adjust the opening degree of each of the electromagnetic proportional pressure reducing valves 311, 312. A part of hydraulic oil that is decompressed and discharged is sent back to the reservoir 215 of the hydraulic pressure supply system 21 mentioned above. In the present embodiment, the front brake cut valve 26 also functions as an ABS cut valve that switches whether an ABS is operated or not, which is adapted to switch whether an ABS on a side of the front brake 11 is operated or not by outputting electronic signal from the controller to a solenoid 261 that constitutes the front brake cut valve 26.

The shuttle valves 313, 314 are provided on output sides of the electromagnetic proportional pressure reducing valves 311, 312. While each first input is connected to the output of the electromagnetic proportional pressure reducing valves 311, 312 respectively, each second input is connected by a piping that communicates each input of the shuttle valves 313, 314. An output piping of the shuttle valve 225 provided on the way of output of the front wheel brake valve 221 is connected to the middle of this piping.

Pressure sensors 315, 316 are provided on the output sides of the electromagnetic proportional pressure reducing valves 311, 312 to detect pressure of the output sides of the electromagnetic proportional pressure reducing valves 311, 312 so as to output the detected pressure signal as electronic signal to the controller (not shown in FIG. 1).

The pressure switch 317 is provided in the middle of an output piping from the shuttle valve 225, which is turned on and off according to the hydraulic pressure of the pressure oil output from the shuttle valve 225.

The rear wheel hydraulic circuit 32 is configured as a hydraulic circuit that controls an ABS of the rear brake 12 and provided with two electromagnetic proportional pressure reducing valves 321, 322, two shuttle valves 323, 324, pressure sensors 325, 326 and a pressure switch 327 in the same manner as the front wheel hydraulic circuit 31. In addition, the rear wheel hydraulic circuit 32 is provided with an ABS cut valve 328 provided on a piping of an input side.

The electromagnetic proportional pressure reducing valves 321, 322 are provided with solenoids 321A, 322A. The opening degree of each of the electromagnetic proportional pressure reducing valves 321, 322 is adjusted based on electronic signal output from the controller.

The ABS cut valve 328 also has a solenoid 328A and switches whether an ABS of the rear brake 12 is functioned or not similarly based on electronic signal output from the controller.

Output of the shuttle valve 323 is connected to the slack adjuster 122 on the left side of the rear brake 12 and output of the shuttle valve 324 is connected to the slack adjuster 122 on the right side of the rear brake 12. Thereby, pressure oil is provided to each of the left and right sides of the slack adjuster 122.

The ABS control hydraulic circuit 3 mentioned as above is functioned as an ABS by changing positions of each valve that constitutes the front wheel hydraulic circuit 31 and the rear wheel hydraulic circuit 32 mentioned above.

In FIG. 1, when a spool of the front brake cut valve 26 on the side of the front wheel is positioned at a lower side and a spool of the ABS cut valve 328 on the side of the rear wheel is positioned at a lower side, the ABS function is being shut down.

In this case, at the front side, pressure oil output from the front wheel brake valve 221 is supplied to the front brake 11 via the shuttle valves 225, 313, 314 by operating the pedal 223 of the foot brake valve 22 so that the front brake 11 functions as a normal brake that increases braking force as the pedal 223 is treaded. Likewise, at the rear side, pressure oil output from the rear wheel brake valve 222 is supplied to the rear brake 12 via the shuttle valves 226, 323, 324 so that the rear brake 12 functions as a normal brake.

Next, in FIG. 1, when a spool of the front brake cut valve 26 on the side of the front wheel is positioned at an upper side and a spool of the ABS cut valve 328 on the side of the rear wheel is positioned at an upper side, the ABS is effectively operated.

In this case, in the front wheel hydraulic circuit 31, when a driver operates the pedal 223 of the foot brake valve 22, pressure oil output from the front wheel brake valve 221 is supplied to the electromagnetic proportional pressure reducing valves 311, 312 to adjust the opening degree of the electromagnetic proportional pressure reducing valves 311, 312 according to electronic signal from the controller so that pressure oil output from the electromagnetic proportional pressure reducing valves 311, 312 is supplied to the front brake 11 via the shuttle valves 313, 314.

On the other hand, when a driver operates the pedal 223, pressure oil output from the rear wheel brake valve 222 is supplied to the electromagnetic proportional pressure reducing valves 321, 322 in the rear wheel hydraulic circuit 32 so that pressure oil output from the electromagnetic proportional pressure reducing valves 321, 322 is supplied to the rear brake 12 via the shuttle valves 323, 324.

At this time, as detailed later, in the controller, rotation speed of the wheel 10 detected by the rotation speed sensors 13FL, 13FR, 13RL, 13RR is monitored and electronic signal to the solenoids 311A, 312A, 321A, 322A is output according to the locking state of each of the wheels 10 to adjust the opening degree of each of electromagnetic proportional pressure reducing valves 311, 312, 321, 322 and the braking force of the front brake 11 and the rear brake 12 to realize a short braking distance and a control in which a service vehicle does not spin out.

4. Arrangement of Controller 4

Figure 2:
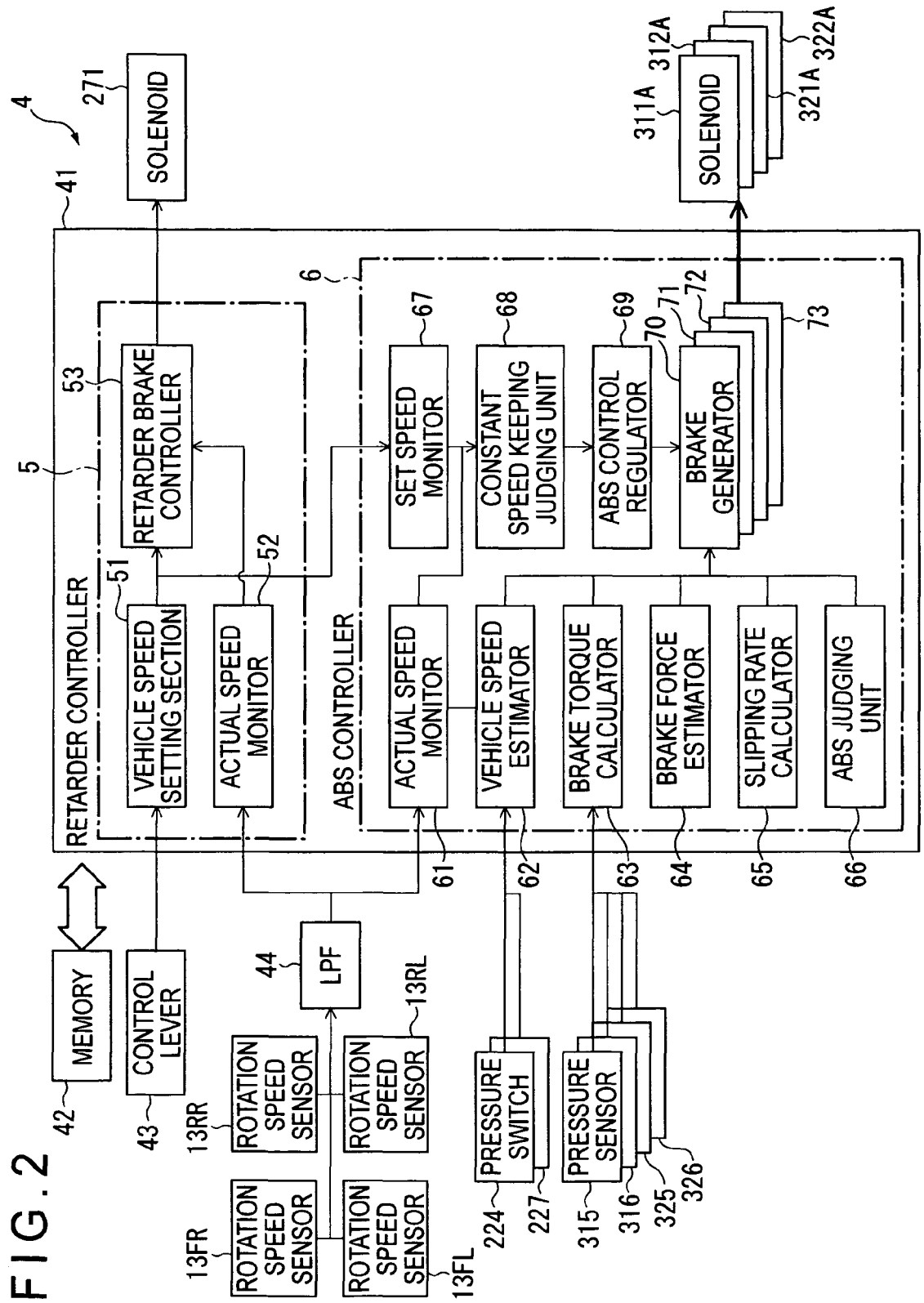
FIG. 2 is a block diagram showing an arrangement of a controller of the present embodiment.

FIG. 2 shows an arrangement of a controller 4 that controls the above-mentioned brake 1.

The controller 4 is provided with a processing unit 41 and a memory 42 (a storage).

A control lever 43 for setting of retarder speed provided in a driver's cabin, the rotation speed sensors 13FL, 13FR, 13RL, 13RR provided on each of the wheels 10, the pressure switches 224, 272 near the electromagnetic proportional pressure reducing valve 27 of the retarder mentioned above and the pressure sensors 315, 316, 325, 326 of the ABS control hydraulic circuit 3 are electrically connected to an input side of the processing unit 41. The rotation speed sensors 13FL, 13FR, 13RL, 13RR are connected to the processing unit 41 via a LPF (Low Pass Filter) 44. Rotation speed signal output from the rotation speed sensors 13FL, 13FR, 13RL, 13RR is input to the processing unit 41 after removing high-frequency components such as disturbance.

On the other hand, the solenoid 271 that adjusts the opening degree of the electromagnetic proportional pressure reducing valve 27 and solenoids 311A, 312A, 321A, 322A of the electromagnetic proportional pressure reducing valves 311, 312, 321, 322 of the ABS control hydraulic circuit 3 are electrically connected to an output side of the processing unit 41.

Further, the memory 42 houses a threshold map for retarder control, a map for ABS sliding control and the like in addition to a program that functions on the processing unit 41, which are to be read out according to a command from the processing unit 41.

The processing unit 41 is provided with a retarder controller 5 and an ABS controller 6. The retarder controller 5 controls the solenoid 271 of the electromagnetic proportional pressure reducing valve 27 connected to the output side. The ABS controller 6 controls the solenoids 311A, 312A, 321A, 322A of the electromagnetic proportional pressure reducing valves 311, 312, 321, 322 of the ABS control hydraulic circuit 3 connected to the output side.

The retarder controller 5 is provided with a vehicle speed setting section 51, an actual speed monitor 52 and a retarder brake controller 53. Although not shown in FIG. 2, information from various sensors such as payload of the service vehicle, inclination condition and the like is also input in the retarder controller 5. The retarder controller 5 realizes a constant speed running control while calculating these conditions.

The vehicle speed setting section 51 is a part to obtain information about what kind of constant speed setting is done by an operator based on operation signal from the control lever 43 for retarder setting control provided in a cab of a service vehicle.

The actual speed monitor 52 is a part to monitor the current vehicle running speed based on rotation speed signal from the rotation speed sensors 13FL, 13FR, 13RL, 13RR provided on each of the wheels 10. In the present embodiment, running speeds of each of the wheels 10 are calculated from rotation speeds of the wheels 10 and radii of the wheels 10, which are averaged to determine the actual running speed of a service vehicle.

The retarder brake control 53 is a part to generate and output control signal to the above-mentioned solenoid 271 based on the set speed acquired by the vehicle speed setting section 51 and the actual running speed of the service vehicle calculated by the actual speed monitor 52. Specifically, the retarder brake controller 53 generates and outputs control signal to the solenoid 271 using a fuzzy control, which increases the braking force when the actual speed is bigger than the set speed and decreases the braking force when the actual speed is smaller than the set speed.

The ABS controller 6 is provided with an actual speed monitor 61, a vehicle speed estimator 62, a brake torque calculator 63, a brake force estimator 64, a slipping rate calculator 65, an ABS judging unit 66, a set speed monitor 67, a constant speed keeping judging unit 68, an ABS control regulator 69 and brake generators 70-73.

The actual speed monitor 61, as well as the actual speed monitor 52 of the retarder controller 5 mentioned above, is a part to monitor the current vehicle running speed based on rotation speed signal from the rotation speed sensors 13FL, 13FR, 13RL, 13RR provided on each of the wheels 10 to determine the running speed of the service vehicle by averaging vehicle speeds given as tangential velocities of each of the wheels 10.

Further, the actual speed monitor 61 is configured to output rotation speed signal of each of the wheels 10 also to the vehicle speed estimator 62.

The vehicle speed estimator 62 is a part to estimate vehicle speed V of a certain time during braking based on rotation speed signal output from the actual speed monitor 61.

Specifically, the vehicle speed estimator 62 firstly calculates variation per hour of rotation speed $\omega$ of each of the wheels 10 (i.e. the derivative value of the rotation speed $d\omega/dt$) and secondly calculates deceleration $dV/dt$ of each of the wheels 10 based on the calculated derivative value of the rotation speed dω/dt, radius of the wheel 10 and slipping rate λ that is stored in the memory 42 in advance and can generate maximum braking force.

Then, the vehicle speed estimator 62 averages vehicle speeds estimated from rotation speeds of each of wheels 10 based on the calculated deceleration dV/dt. The averaged value is output to the slipping rate calculator 65 and the ABS judging unit 66 as the vehicle speed V of the service vehicle.

The brake torque calculator 63 is a part to calculate the brake torque based on the braking pressure detected by the pressure sensors 315, 316, 325, 326 provided on the ABS control hydraulic circuit 3. Specifically, the brake torque is calculated based on Tb=kP (k: proportional constant) in view of the proportional relationship between brake torque Tb and braking pressure P.

The brake force estimator 64 estimates braking force based on the calculated brake torque. Estimation of braking force by the brake force estimator 64 is done by least-squares method. Specifically, when braking force is expressed as Fx, wheel inertia is expressed as J, angular speed change rate is expressed as dω/dt and radius of a tire of the wheel 10 is expressed as r, the brake force estimator 64 estimates braking force based on the below expression (1).

[Expression 1]
$$Fx = \frac{J\frac{d\omega}{dt} + Tb}{r} \quad (1)$$

The slipping rate calculator 65 calculates slipping rate λ by the below expression (2) based on the vehicle speed V estimated by the vehicle speed estimator 62, radius of the wheel 10 and rotation speed ω.

[Expression 2]
$$\lambda = \frac{V - r\omega}{V} \quad (2)$$

The ABS judging unit 66 is a part to judge whether ABS is started or stopped based on the vehicle speed V estimated by the vehicle speed estimator 62 and the slipping rate λ calculated by the slipping rate calculator 65. Specifically, in the present embodiment, dω/dt<−0.6 g is set as the ABS starting condition and λ≦5% or V≈0 (ex. 3 km/h or less) is set as the ABS stop condition.

The set speed monitor 67 is a part to monitor whether the vehicle speed setting section 51 of the retarder controller 5 sets the vehicle speed for constant speed running or not and how much speed is set for the set speed, which also serves as a retarder control judging unit and a set speed monitor of the present invention. Stated another way, the set speed monitor 67 recognizes whether retarder control is in effect or not based on whether speed is set or not. If speed is set, the set speed monitor 67 acquires the set speed of the moment.

The constant speed keeping judging unit 68 is a part to judge whether the speed is kept constant during retarder control based on the set speed of the retarder acquired by the set speed monitor 67 and the actual speed of the service vehicle calculated by the actual speed monitor 61. There can be various ways to judge whether the running speed is being kept constant or not. For example as follows:
(a) Certain upper and lower thresholds (10% up/down relative to the set speed and the like) are set with respect to the set speed. When the actual speed exceeds the thresholds, it is judged that the speed is not kept constant. (b) The actual speed is acquired several times at specified time intervals. When the average value exceeds approximately 1 to 2% with respect to the set speed, it is judged that the speed is not being kept constant.

The ABS control regulator 69 is a part to do a process that prioritizes retarder control over brake control of the ABS controller 6 by stopping the brake control of the ABS controller 6 when it is judged by the constant speed keeping judging unit 68 that the speed is not being kept constant under retarder control. The ABS control regulator 69 stops ABS control by regulating control signal output to the below-mentioned brake generators 70-73.

The brake generators 70-73 control the adjustment of the opening degree of the electromagnetic proportional pressure reducing valves 311, 312, 321, 322 that constitute the ABS control hydraulic circuit 3, which control the adjustment of the opening degree by outputting control signal to the solenoids 311A, 312A, 321A, 322A that constitute the electromagnetic proportional pressure reducing valves 311, 312, 321, 322. In the present embodiment, the electromagnetic proportional pressure reducing valves 311, 312, 321, 322 are provided on each of the wheels 10 correspondingly. The brake generators 70-73 are arranged to be able to output control signal independently to the electromagnetic proportional pressure reducing valves 311, 312, 321, 322 to execute ABS control to each of the wheels 10 independently.

Specifically, each of the brake generators 70-73 generates braking force that should be given to each of the wheels 10 by well-known sliding control based on the vehicle speed V estimated by the vehicle speed estimator 62 mentioned above and the rotation speed ω of each of the wheels 10 detected by the rotation speed sensors 13FL, 13FR, 13RL, 13RR of each of the wheels 10 and outputs corresponding electronic signal to the solenoids 311A, 312A, 321A, 322A of the electromagnetic proportional pressure reducing valves 311, 312, 321, 322.

5. Effect and Advantage of Controller 4

Effect of the controller 4 mentioned above will be described below with reference to a flow chart shown in FIG. 3.

While a vehicle is running, the rotation speed sensors 13FL, 13FR, 13RL, 13RR detect rotation speeds of each of the wheels 10 at predetermined time intervals and output rotation speed signal to the controller 4 regularly (process S1).

The actual speed monitor 61 calculates variation of rotation speed per unit time based on the rotation speed signal output from the rotation speed sensors 13FL, 13FR, 13RL, 13RR to compute rotation speed derivative value dω/dt of each of the wheels 10 (process S2).

The vehicle speed estimator 62 computes deceleration dV/dt of each of the wheels 10 based on the calculated rotation speed derivative value dω/dt and the vehicle speed previously calculated (process S3).

The brake torque calculator 63 detects braking pressure based on the pressure signal of the hydraulic circuit detected by the pressure sensors 315, 316, 325, 326 provided on the ABS control hydraulic circuit 3 (process S4) and calculates brake torque Tb based on the detected braking pressure (process S5).

The vehicle speed estimator 62 monitors whether a driver stepped on the pedal 223 of the foot brake valve 22 or not based on the signal from the pressure switch 224 (process S6). When it is judged that the pedal 223 was stepped on, the vehicle speed estimator 62 calculates vehicle speed obtained from each of the wheels 10 based on deceleration dV/dt to estimate the vehicle speed by averaging vehicle speeds calculated from each of the wheels 10 (process S7).

Next, the slipping rate calculator 65 calculates slipping rate λ by the above expression (2) (process S8). Then, the brake force estimator 64 calculates estimated braking force Fx using the expression (1) from the brake torque Tb computed by the brake torque calculator 63 (process S9).

The ABS judging unit 66 judges whether ABS control is to be started or not based on the calculated slipping rate λ, vehicle speed V and angular speed change rate dω/dt (process S10). When ABS control is not to be started, a flow from a series of processes S1 to S9 is repeated.

On the other hand, when the ABS judging unit 66 judges that ABS control is to be started, the set speed monitor 67 judges if the constant speed running control is conducted by the retarder (process S11). When it is judged that the running speed is not being controlled to be kept constant by the retarder, anti-lock control by ABS is done to each of the wheels 10 as usual.

When it is judged that the constant speed running control is conducted by the retarder, the set speed monitor 67 obtains the set vehicle speed determined by the vehicle speed setting section 51 of the retarder (process S12) and the actual speed monitor 61 calculates the actual speed of the vehicle of the moment based on the rotation speed signal from the rotation speed sensors 13FL, 13FR, 13RL, 13RR (process S13).

The constant speed keeping judging unit 68 judges whether the running speed is being controlled to be kept constant by the retarder based on the obtained set vehicle speed and the calculated actual speed (process S14). When it is judged that the running speed is not being controlled to be kept constant by the retarder, the ABS control regulator 69 regulates ABS control (process S15) and the process flow returns back to the process S1 to repeat the flow.

On the other hand, when it is judged that the running speed is being kept constant, each of the brake generators 70-73 generates braking force for each of the wheels 10 (process S16), which is transmitted as electronic signal to the solenoids 311A, 312A, 321A, 322A to adjust the opening degree of each of the electromagnetic proportional pressure reducing valves 311, 312, 321, 322 so as to realize braking control by ABS (process S17).

The ABS judging unit 66 repeats the above-mentioned consecutive processes until the estimated vehicle speed V becomes V≈0 or the slipping rate λ becomes λ≦5%. When any one of these conditions is achieved, ABS control is stopped (process S18).

As above, during retarder control, the set speed monitor 67 as a retarder control judging unit judges whether the constant speed running control is conducted by the retarder. When the constant speed running control is conducted, the constant speed keeping judging unit 68 judges whether the running speed is being kept constant based on the set speed obtained by the set speed monitor 67 and the actual speed calculated by the actual speed monitor 61. When the running speed is not being kept constant, the ABS control regulator 69 regulates the ABS control. As a consequence, running speed can be surely kept constant by the retarder.

6. Modification(s)

The scope of the present invention is not limited to the above embodiment(s) but includes following modification(s) as long as an object of the present invention can be achieved.

For example, the present invention is used for service vehicles such as a dump truck in the above-mentioned embodiment, but not limited to this, the present invention may be applied to service vehicles such as a wheel loader, normal passenger vehicles and the like.

Figure 3:
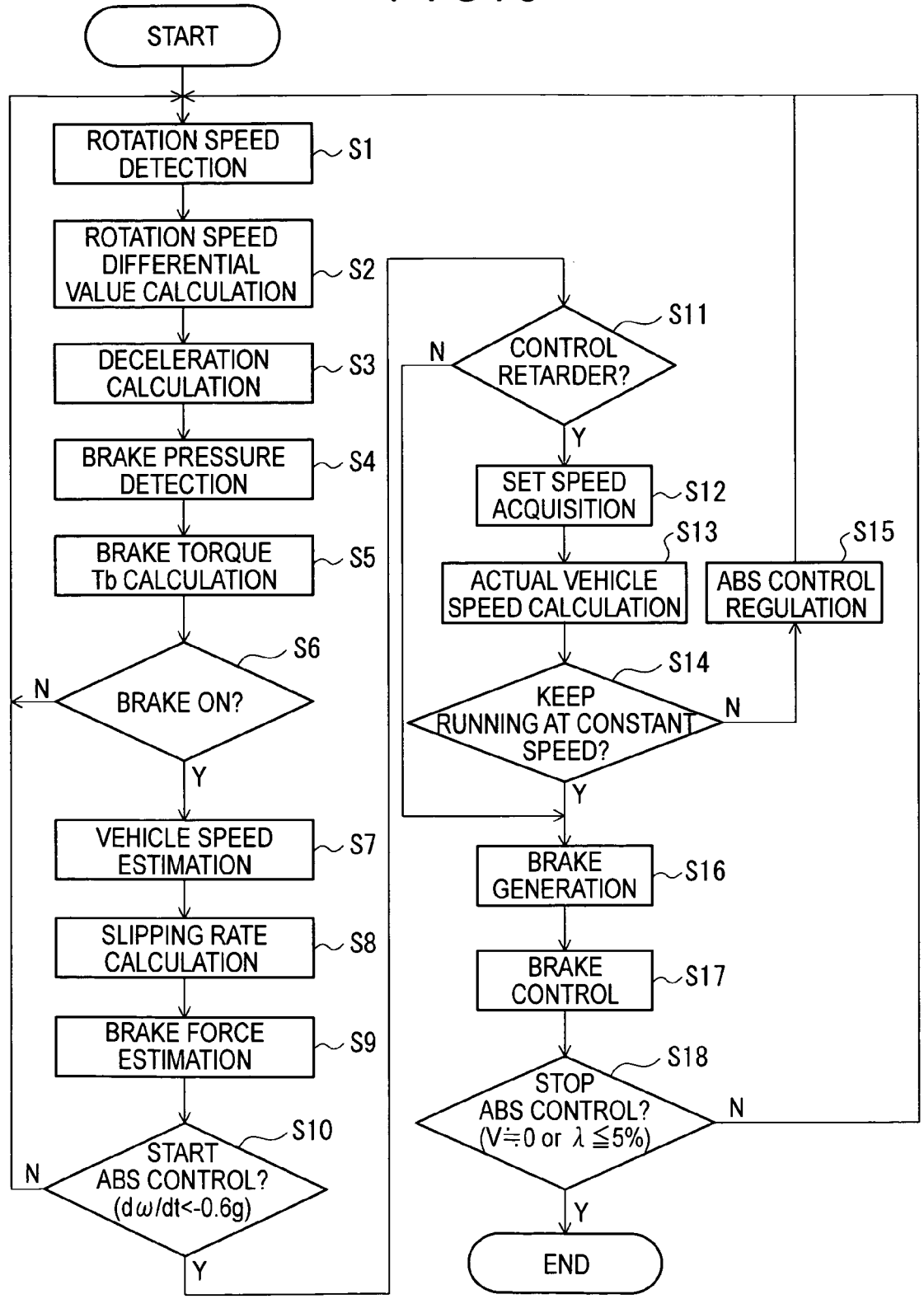
FIG. 3 is a flow chart describing an effect of the present embodiment.

Further, it is explained that the ABS control regulator 69 regulates control signal output to the brake generators 70-73 in the above-mentioned processes explained based on the flow chart shown in FIG. 3, however, the ABS control may be regulated by the ABS control regulator 69 switching the ABS cut valve 328.

Specific configuration and arrangement in implementing the present invention may be designed in any manner as long as an object of the present invention can be achieved.

INDUSTRIAL APPLICABILITY

The present invention can also be used for passenger vehicles and the like in addition to service vehicles such as a dump truck.

The invention claimed is:

1. An antilock brake system control device that regulates an antilock brake system of a vehicle that has a retarder to control constant speed running while avoiding wheels of the vehicle to be locked upon braking of the vehicle, the control device comprising:
    a rotation speed detector that detects a rotation speed of each of the wheels;
    a brake controller that controls the braking of each of the wheels based on the rotation speed of each of the wheels which is detected by the rotation speed detector;
    a retarder control judging unit that judges whether constant speed running control is conducted by the retarder or not;
    a set speed monitor that monitors a set speed determined by the retarder when the retarder control judging unit judges that the constant speed running control is conducted by the retarder;
    an actual speed monitor that monitors an actual speed of the vehicle which is calculated based on the rotation speed of each of the wheels detected by the rotation speed detector;
    a constant speed keeping judging unit that judges whether a running speed is being kept constant at the set speed determined by the retarder or not using the set speed monitor and the actual speed monitor, and
    an ABS control regulator that regulates brake control by the brake controller when it is judged that the running speed is not being kept constant at the set speed.

2. An antilock brake system control method that regulates an antilock brake system of a vehicle that has a retarder to control constant speed running while avoiding wheels of the vehicle to be locked upon braking of the vehicle, the control method comprising:
    detecting a rotation speed of each of the wheels;
    controlling the braking of each of the wheels based on the detected rotation speed of each of the wheels;
    judging whether constant speed running control is conducted by the retarder or not;
    judging whether a running speed is being kept constant at a set speed determined by the retarder based on the set speed determined by the retarder and an actual speed of the vehicle which is calculated from the rotation speed of each of the wheels when it is judged that the constant speed running control is conducted by the retarder, and
    regulating the brake control when it is judged that the running speed is not being kept constant at the set speed.

* * * * *